US006961638B2

(12) United States Patent
Ouellette

(10) Patent No.: US 6,961,638 B2
(45) Date of Patent: Nov. 1, 2005

(54) REJECT BOTTLE DETECTION AND EJECTION MECHANISMS

(75) Inventor: Joseph F. Ouellette, Glendale, MI (US)

(73) Assignee: Oullette Machinery Systems, Inc., Fenton, MO (US)

( * ) Notice: Subject to any disclaimer, the term of this patent is extended or adjusted under 35 U.S.C. 154(b) by 601 days.

(21) Appl. No.: 10/007,052

(22) Filed: Dec. 3, 2001

(65) Prior Publication Data

US 2003/0105550 A1 Jun. 5, 2003

(51) Int. Cl.[7] ........................ G06F 7/00; B65G 47/26

(52) U.S. Cl. .................... 700/213; 198/438; 198/464.4; 198/395

(58) Field of Search ............................ 198/438, 464.4, 198/395; 700/213

(56) References Cited

U.S. PATENT DOCUMENTS 3,295,661 A * 1/1967 Mitchell, Jr. et al. ....... 198/391
3,710,922 A * 1/1973 Lanphere et al. ........... 198/395
4,158,624 A * 6/1979 Ford et al. .................. 209/523
4,173,276 A * 11/1979 Raudat et al. .............. 198/437
4,720,797 A * 1/1988 Sommerfield et al. ...... 700/213
4,819,784 A * 4/1989 Sticht ......................... 198/395
4,898,271 A * 2/1990 Schiessl ...................... 198/444
5,065,852 A * 11/1991 Marti ......................... 198/392
5,135,101 A * 8/1992 Dudley ....................... 198/438
5,388,682 A * 2/1995 Dudley ....................... 198/367
5,924,546 A * 7/1999 Funaya ....................... 198/395
6,360,142 B1 * 3/2002 Miura et al. ................ 700/245
6,365,906 B1 * 4/2002 Spangenberg et al. ... 250/559.3
6,401,904 B1 * 6/2002 Risley ........................ 198/380
6,479,777 B2 * 11/2002 Yamakawa .................. 209/574
6,508,351 B1 * 1/2003 Christoffersen et al. .... 198/394

* cited by examiner

*Primary Examiner*—Richard Ridley
(74) *Attorney, Agent, or Firm*—Thompson Coburn LLP

(57) ABSTRACT

A reject bottle detection and ejection apparatus has a plurality of sensors positioned along the length of a belt conveyor that senses whether a bottle conveyed by the conveyor is positioned in an upright orientation, in an inverted orientation, in a sideways orientation, in a slanted orientation, or whether the bottle is damaged, and an air jet nozzle positioned downstream of the plurality of sensors that selectively emits a jet of air at a bottle conveyed past the air jet that has been sensed to be not in the upright orientation or to be damaged, thus removing the bottle from the conveyor.

18 Claims, 6 Drawing Sheets

REJECT BOTTLE DETECTION AND EJECTION MECHANISMS

BACKGROUND OF THE INVENTION (1) Field of the Invention

The present invention pertains to an apparatus positioned along the length of a conveyor that detects the orientation and condition of objects conveyed by the conveyor and selectively removes objects from the conveyor depending on the sensed orientation of the object on the conveyor and the sensed condition of the object on the conveyor. More specifically, the present invention pertains to a plurality of sensors positioned along the length of a belt conveyor that senses whether a bottle conveyed by the conveyor is positioned in an upright orientation, in an inverted orientation, in a sideways orientation, in a slanted orientation, or whether the bottle is damaged, and an air jet nozzle positioned downstream of the plurality of sensors that selectively emits a jet of air at a bottle conveyed past the air jet that has been sensed to be not in the upright orientation or to be damaged, thus removing the bottle from the conveyor.

(2) Description of the Related Art

In conveying systems that convey light-weight objects in the manufacture and/or packaging of the objects, for example a belt conveyor conveying empty, plastic blow molded bottles, the objects or bottles are often fed from a large bin onto the conveyor surface. The bin is filled with bottles in random orientations and although the dispensing mechanism of the bin is designed to position bottles on the moving conveyor surface with the bottles in upright orientations, bottles can be deposited onto the moving conveyor surface in other than the upright orientation. For example, a bottle could be deposited onto the conveyor in an inverted orientation of the bottle, with the bottle balanced on its spout opening. The bottle could also be deposited onto the conveyor in a sideways orientation of the bottle, with the bottle laying on its side. A pair of bottles could be deposited onto the conveyor with both bottles oriented sideways with one bottle laying on its side on the conveyor and the other bottle laying on its side on top of the one bottle. If the bottles are being deposited onto the conveyor in a sequence, a bottle in the sequence could be deposited by the bin onto the conveyor with the bottle in a slanted orientation with the bottle slanting toward and engaging against either the bottle before it in the sequence or the bottle after it in the sequence. In addition, bottles in less than perfect condition could also be deposited by the bin onto the moving conveyor. For example, imperfect bottles or bottles that have been crushed, torn apart or molded incorrectly could be deposited by the bin onto the conveyor. It is also possible that a bottle preform or the plastic blank that is blow molded into a bottle could end up in the bin and be deposited on the conveyor. Other foreign objects could also end up in the bin and be deposited onto the moving conveyor surface.

The incorrectly oriented bottles, the damaged bottles or bottles in imperfect condition, as well as the other debris deposited onto the moving surface of the conveyor must be removed from the conveyor to prevent these objects from being included among the properly formed, upright oriented bottles that are further processed downstream of the conveyor, for example being processed by being formed in rows and palletized. Manually inspecting each bottle as it is conveyed along the conveyor increases the manufacturing and/or packaging costs of the bottles. What is needed to avoid these additional costs is an automated apparatus that can detect when a bottle is properly formed and in an upright orientation on the conveyor, as well as detect bottles in a variety of orientations other than the upright orientation on the conveyor, and detect crushed or incorrectly molded bottles and other bottles in imperfect condition and other debris, and automatically remove all bottles and debris from the conveyor surface other than the properly molded and upright oriented bottles.

SUMMARY OF THE INVENTION

The apparatus of the present invention overcomes the disadvantages associated in detecting improperly oriented or imperfect bottles as well as other debris on a conveyor surface. The invention basically comprises a means of detecting the orientation of bottles as well as other debris conveyed by the conveyor surface and producing a signal representative of the detected orientation of the bottle or other debris, and a means of removing all but the properly formed bottles in upright orientations from the conveyor in response to the signals produced by the detecting means.

The apparatus is positioned along the length of a belt conveyor between an upstream end of the conveyor that receives bottles dispensed by a bin or other mechanism onto the conveyor surface, and a downstream end of the conveyor that provides properly formed bottles in upright orientations to further processing of the bottles at the downstream end of the conveyor. The apparatus includes three photosensors, each including a photo emitter and a reflector positioned on opposite sides of the conveyor, that are arranged in a vertical line toward the upstream end of the conveyor. These photosensors sense the presence or absence of a bottle on the conveyor adjacent the photosensors by either sensing a "dark" condition where the light emitted by each of the emitters if blocked by a bottle, or a "light" condition where the light emitted by each of the sensors is not blocked by a bottle. Each of the photosensors also communicates with a central processing unit (CPU) with an encoder. The central processing unit calculates a period of time that each photosensor senses a "dark" or "light" condition. Depending on which photosensors sense a "dark" or "light" condition, and depending on the period of time the condition is sensed by each photosensor, the central processing unit (CPU) determines whether the sensors are sensing a bottle in an upright orientation, a bottle in a sideways orientation, a pair of stacked bottles in sideways orientations, a bottle in a slanted oriented, or damaged bottles or other debris conveyed by the conveyor past the photosensors.

An additional photosensor is positioned along the conveyor length slightly ahead of or upstream of the three vertically arranged photosensors. Further ahead of the additional photosensors are two pairs of vertical arrays of fiber-optic photosensors with light emitting fibers on one side of the conveyors and light receptor fibers on the opposite side of the conveyors. The two pairs of fiber-optic arrays are spaced along the conveyor length by a distance that is slightly larger than the spout of the bottle being conveyed by the conveyor. The additional photosensor and the two vertical arrays of fiber-optic photosensors also communicate with the CPU and provide signals to the CPU representative of a bottle conveyed by the conveyor in an inverted orientation past the sensors.

The means for removing bottles and other objects from the conveyor includes a pair of air jet nozzles positioned in a vertical line adjacent the conveyor and downstream of the photosensors. Each of the nozzles is provided with a jet of air controlled by a solenoid valve. Selective operation of the solenoids ejects a burst of air from one or both of the air jet nozzles that removes an object conveyed past the nozzles from the conveyor.

Further downstream of the conveyor is an additional photosensor that detects objects jammed on the conveyor. This additional sensor also communicates with the CPU and provides a signal to the CPU indicative of a sensed jammed object on the conveyor at the location of the jam sensor. Further downstream of this jam sensing photosensor is an additional pair of air jets that are selectively operated by a solenoid valve controlled by the CPU to eject a burst of air toward the object jammed on the conveyor, removing the object from the conveyor.

BRIEF DESCRIPTION OF THE DRAWINGS

Further features of the invention are revealed in the following detailed description of the preferred embodiment of the invention and in the drawing figures wherein.

DETAILED DESCRIPTION OF THE PREFERRED EMBODIMENT

Figure 1:
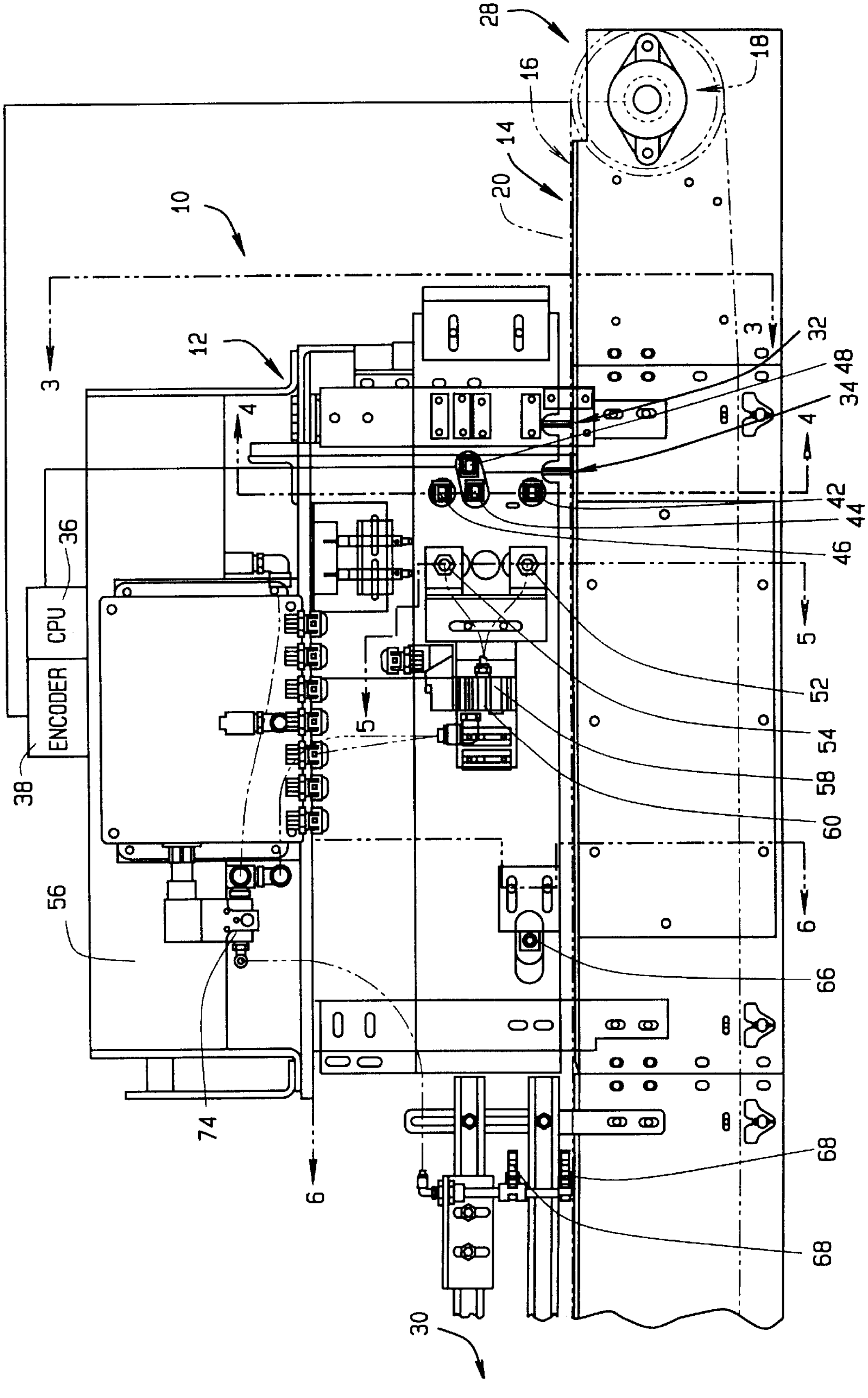
FIG. 1 is a side elevation view of the reject object detection and ejection apparatus of the invention positioned adjacent a belt conveyor.

FIG. 1 shows a side view of the reject bottle detection and ejection apparatus 10 of the present invention mounted to a framework 12 adjacent a conveyor 14. The conveyor 14 and framework 12 supporting the apparatus 10 of the invention are typical and therefore will not be described in detail.

The conveyor 14 is shown in dashed lines in FIG. 1 and in the illustrative embodiment is a belt and pulley conveyor comprising a conveying belt 16 wrapped around an upstream pulley 18 at one end and a downstream pulley (not shown) at its opposite end. The upstream pulley 18 is shown to the right in FIG. 1. The support surface 20 of the conveyor belt 16 conveys objects placed on the belt in a downstream direction or to the left as viewed in FIG. 1. In the illustrative embodiment, the objects conveyed on the belt support surface 20 are plastic, blow molded bottles 22, one of which is shown in each of FIGS. 2–6. Each bottle has a body portion 24 and a spout 26. The bottles in each of the drawing figures are shown in their upright orientations.

The framework 12 is basically comprised of a plurality of metal members that are attached to the support structure of the conveyor 14 and project upwardly on opposite sides of the conveyor. The particular configurations of each of the members of the framework 12 are determined to position the component parts of the reject bottle detection and ejection apparatus 10 of the invention in their positions relative to the conveyor belt support surface 20 to be described. The framework supports the apparatus 10 in a position along the length of the conveyor 14 between the upstream end 28 of the conveyor that receives bottles 22 dispensed by a bin or other mechanism (not shown), and a downstream end 30 of the conveyor that is intended to provide properly formed bottles in upright orientations for further processing of the bottles at the downstream end of the conveyor.

Figure 2:
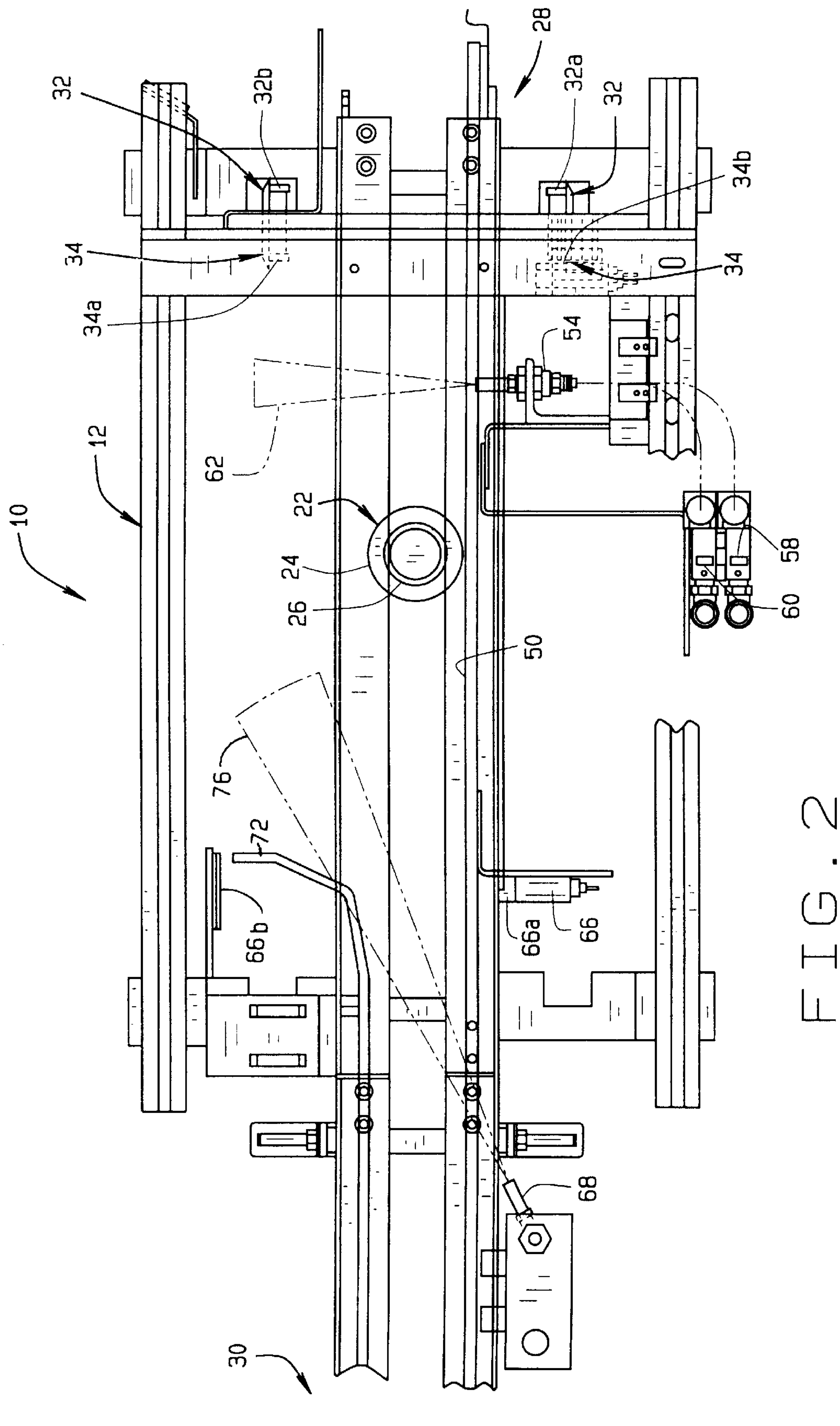
FIG. 2 is a top plan view of the apparatus shown in FIG. 1.
Figure 3:
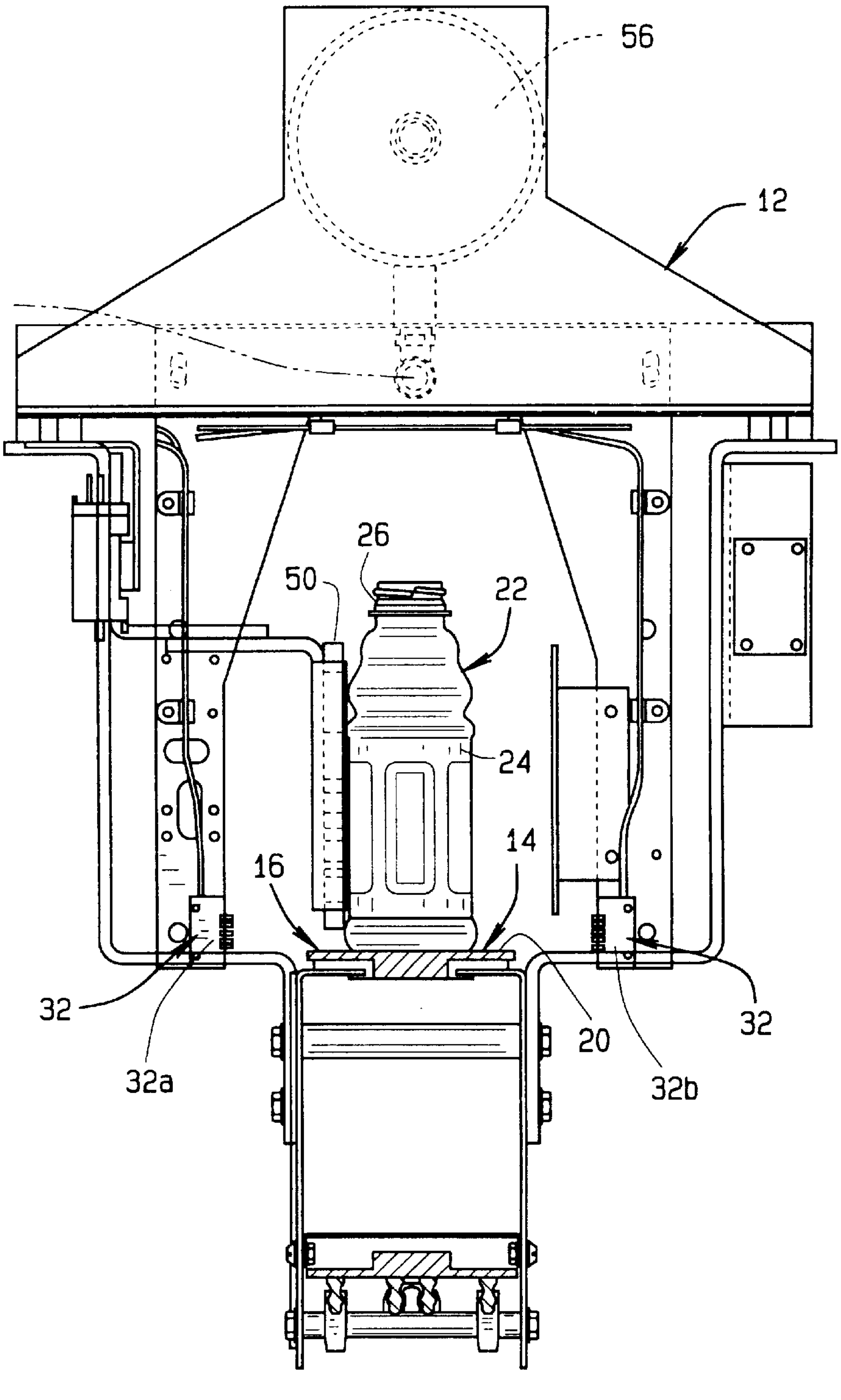
FIG. 3 is an end view of the apparatus from the plane of line 3—3 of FIG. 1.
Figure 4:
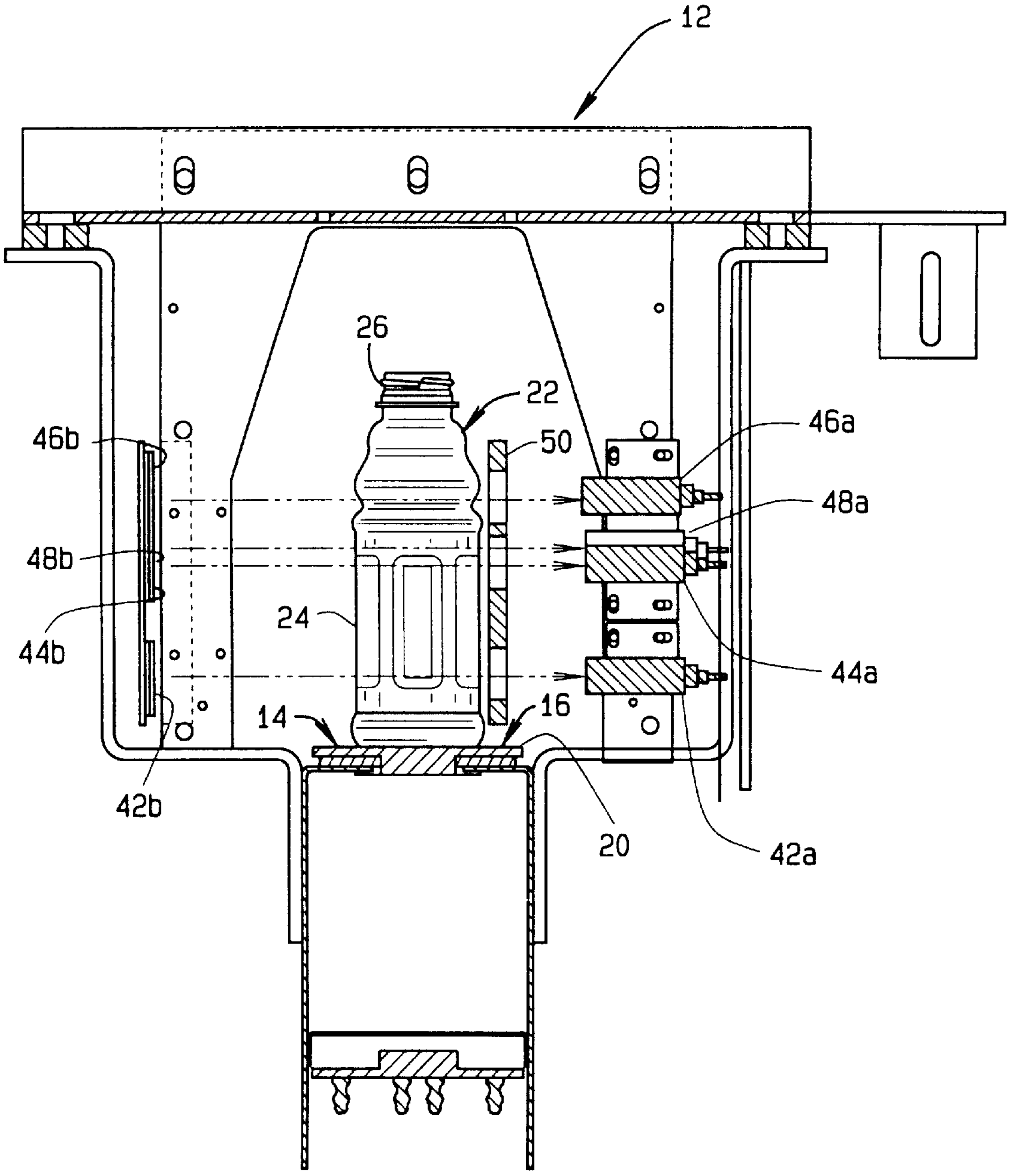
FIG. 4 is a cross-section view of the apparatus from the plane of line 4—4 shown in FIG. 1.
Figure 5:
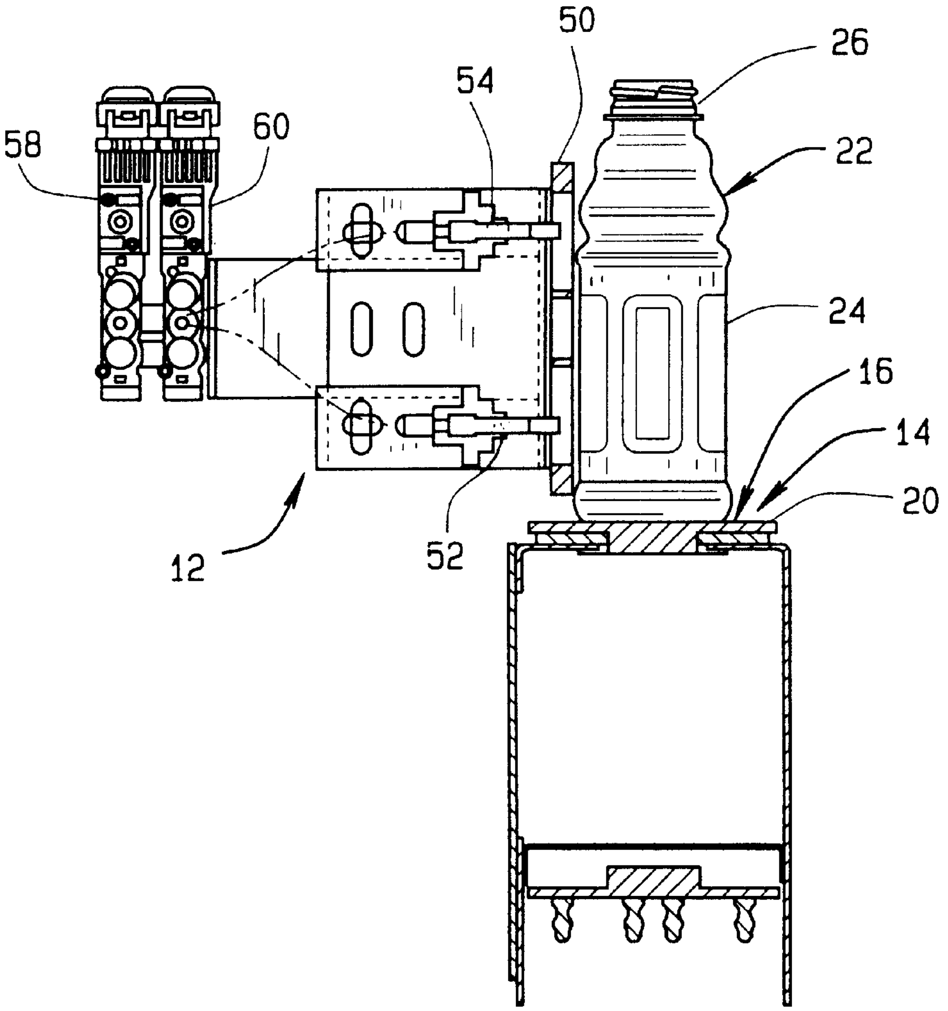
FIG. 5 is a cross-section view of the apparatus from the plane of line 5—5 shown in FIG. 1.
Figure 6:
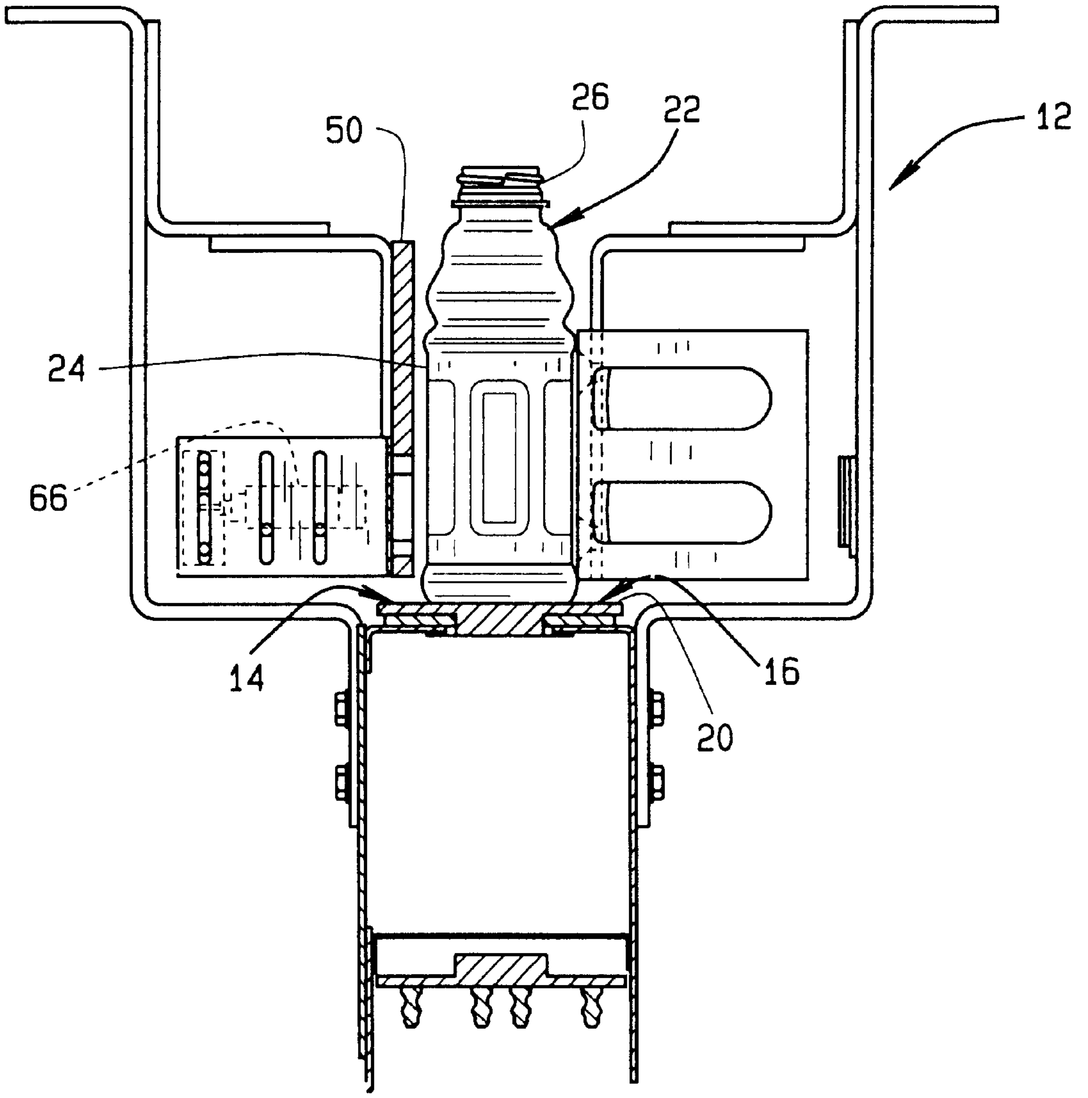
FIG. 6 is a cross-section of the apparatus from the plane of line 6—6 of FIG. 1.

The means for sensing an orientation of a bottle conveyed on the conveyor 14 comprises a pair of optic fiber photosensor assemblies 32, 34 supported by the framework 12 at spaced positions relative to each other and on opposite sides of the conveyor 14 as shown in FIGS. 1, 2 and 3. The optic fiber photosensor assemblies 32, 34 are of the type manufactured by Banner Engineering Corp. of Minneapolis, Minn. Each optic fiber photosensor assembly includes an optic fiber photo emitter 32*a*, 34*a* and an optic fiber photo receptor 32*b*, 34*b*, with the emitters and receptors being positioned directly across the conveyor 14 from each other as shown in FIG. 2. The optic fiber photosensor assemblies 32, 34 are spaced from each other along the length of the conveyor 14 by a distance that is slightly larger than the diameter of the bottle spout 26 as shown in FIGS. 1 and 2. Each of the optic fiber photo emitters 32*a*, 34*a* is comprised of a plurality of optic fibers arranged in a vertical line that each emit light toward the opposite optic fiber photo receptor 32*b*, 34*b*. Each of the optic fiber photo receptors 32*b*, 34*b* is also comprised of a plurality of optic fibers arranged in a vertical line. The emitters 32*a*, 34*a* of each assembly are positioned on opposite sides of the conveyor and the receptors 32*b*, 34*b* of each assembly are positioned on opposite sides of the conveyor.

Each of the optic fiber photosensor assemblies 32, 34 communicate with a central processing unit (CPU) 36. An encoder 38 also communicates with the CPU. The encoder 38 is operatively connected with the conveyor 14 and provides timing signals to the CPU 36 that are based on the speed at which the conveyor 14 is operating. The encoder produces a steady stream of pulsed signals, with the speed or frequency of the signals being based on the speed of operation of the conveyor. As the speed of the conveyor is increased or decreased, the frequency or speed of the pulsed signals produced by the encoder 38 increases or decreases. Predetermined counts of the encoder pulsed signals are used by the CPU 36 to time the operation of the apparatus. The optic fiber photosensor assemblies 32, 34 provide signals to the CPU 36 that are representative of a sensed "dark" condition between the photosensor emitters 32*a*, 34*a* and receptors 32*b*, 34*b*, or a "light" condition sensed between the sensor emitters 32*a*, 34*a*, and receptors 32*b*, 34*b*. The "light" signal is provided to the CPU when a beam of light emitted from the optic fibers of the emitters 32*a*, 34*a* is received by the receptors 32*b*, 34*b*. The "dark" signal is sent to the CPU 36 when a portion of a bottle blocks the passage of light between the sensor emitters 32*a*, 34*a* and receptors 32*b*, 34*b*. The encoder 38 provides pulsed signals to the CPU 36 that are representative of a period of operation of the conveyor during which the optic fiber photosensor assemblies 32, 34 sense a "light" condition or a "dark" condition. From this information, the CPU determines the orientations of bottles conveyed past the photosensors.

In addition to the optic fiber photosensor assemblies 32, 34, the means for sensing an orientation of an object conveyed by the conveyor 14 includes three photosensors 42, 44, 46 supported on the framework 12 adjacent the conveyor 14 in a vertical line, and a fourth photosensor 50 supported on the framework 12 slightly toward the upstream side of the three photosensors 42, 44, 46. Each of these four photosensors 42, 44, 46, 48 includes a light beam emitter 42*a*, 44*a*, 46*a*, 48*a* on one side of the conveyor 14 and an associated reflector 42*b*, 44*b*, 46*b*, 48*b* on the opposite side of the conveyor. Each of these photosensors 42, 44, 46, 48 also communicate with the CPU 36 and provide the CPU with signals representative of a sensed "light" condition or a sensed "dark" condition in the same manner as the optic fiber photosensors 32, 34 explained earlier. When the light beam emitted by the emitters 42*a*, 44*a*, 46*a*, 48*a* is reflected by its associated reflector 42*b*, 44*b*, 46*b*, 48*b*, a "light" signal is provided to the CPU. When a bottle is positioned between the emitters 42*a*, 44*a*, 46*a*, 48*a* and the reflectors 42*b*, 44*b*, 46*b*, 48*b*, the reflection of the light is blocked and a "dark" signal is sent by the particular photosensor to the CPU 36. The encoder 38 provides the pulsed signal information to the CPU 36 representative of the period of operation of the conveyor that each of these photosensors 42, 44, 46, 48 senses either a "light" or "dark" condition.

A first guide rail 50 extends along one side of the conveyor 14 and assists in maintaining bottles conveyed by the conveyor in the orientations in which they are deposited on the conveyor. The means positioned along the length of the conveyor for removing an object from the conveyor comprises a pair of vertically spaced air jets 52, 54 that communicate with a pressurized air surge tank 56 through respective solenoid valves 58, 60. The air jets 52, 54 are supported by the framework 12 adjacent one side of the conveyor along which the first guide rail 50 extends. The solenoid valves 58,60 communicate with the CPU 36 and the CPU controls the timing of the opening and closing of each of the solenoid valves. The CPU also controls the duration in which the solenoid valves 58, 60 are opened based on counting signals provided by the encoder 38. The opening of each of the solenoid valves 58, 60 communicates the air surge tank 56 with their associated air jets 52, 54 causing a burst of air to be ejected from the air jets through the guide rail 50. As seen in FIG. 2, the burst of air ejected from each of the air jets 52, 54 is directed transversely across the conveyor 14 toward the side of the conveyor with no guide rail. When the air jet impacts against the side of a bottle, the bottle is quickly ejected off the side of the conveyor 14 along the ejection path 62 shown in dashed lines in FIG. 2.

Further downstream along the conveyor 14 is an additional means for removing bottles from the conveyor. This includes a bottle jam detecting photosensor 66 and a pair of jam ejecting air jet nozzles 68. The jam detecting photosensor 66 is supported by the framework 12 in the same manner as the previously described four photosensors 42, 44, 46, 48 with the light beam emitter 66*a* of the photosensor positioned on one side of the conveyor 14 and its associated reflector 66*b* positioned on the opposite side of the conveyor. As best seen in FIG. 2, the jam detecting photosensor 66 is positioned along the conveyor length just as a converging portion 72 of a second guide rail merges with the side of the conveyor 14 opposite the first guide rail 50 on the opposite side of the conveyor. Together, the two guide rails 50, 72 assist in maintaining the desired upright orientations of the bottles conveyed to the downstream end 30 of the conveyor. The spacing of the guide rails 50, 72 on the opposite sides of the conveyor 14 as they extend toward the conveyor downstream end 30 is slightly larger than the width dimension of the bottles 22, allowing the bottles to easily pass between the guide rails as they are conveyed downstream by the conveyor. However, with improperly oriented bottles and other debris being ejected from the conveyor just upstream of the converging guide rail 72, it is possible that bottles could become jammed as they are conveyed between the converging guide rail 72 and the opposite guide rail 50. Jammed bottles in this area of the conveyor are detected by the jam detecting photosensor 66 which senses a "dark" condition for a period of conveyor operation determined by the encoder 38. The jam detecting photosensor 66 also communicates with the CPU 36 to provide the CPU with a signal indicative of a jammed condition in the area of the jam detecting photosensor.

The pair of jam ejecting air jet nozzles 68 are also supported by the framework 12 and communicate through a solenoid valve 74 with the air surge tank 56. The solenoid valve 74 communicates with the CPU 36 and is controlled by the CPU to open and close when a jam condition is sensed by the jam detecting photosensor 66. When the solenoid valve 74 is opened, pressurized air is provided to the pair of jam ejecting air jet nozzles 68 that eject a burst of air through the first guide rail 50 and across the conveyor 14 along the ejection path 76 shown in dashed lines in FIG. 2 to remove the jammed bottles from the conveyor surface 20.

In operation of the apparatus of the invention, bottles contained in a bin or other discharging device (not shown) are discharged to a hold back belt conveyor (not shown) that operates at a slightly slower speed than the conveyor and deposits or conveys the bottles in a spaced sequence on the support surface 20 of the conveyor 14. The conveyor 14 conveys the bottles through the apparatus of the invention from right to left as shown in FIGS. 1 and 2. The speed of the conveyor 14 is communicated to the encoder 38 which produces a steady stream of pulse signals with a frequency that is based on the speed of the conveyor. As an alternative to the encoder 38, a timing mechanism could be provided, communicating with the CPU 36. As bottles are conveyed past the photosensors of the apparatus 10, certain of the photosensors will sense a "dark" condition for certain time intervals determined by the encoder. Signals representative of the "dark" condition are sent by each of the photosensors to the CPU and signals representative of the time period of the sensed "dark" period are sent by the encoder 38 to the CPU. Based on this information, the CPU 36 determines whether the air jets should be operated to eject a bottle from the conveyor 14.

In one situation where a properly formed bottle is conveyed by the conveyor 14 in its upright orientation through the apparatus 10 of the invention, the orientation of the bottle is sensed by the three photosensors 42, 44, 46 arranged in the single vertical line each sensing a "dark" condition at approximately the same time. In addition, the three photosensors 42, 44, 46 will sense the "dark" condition for a predetermined number of pulse signals counted by the encoder 38 that is sufficient for the bottle 22, having a particular width, to pass before the three photosensor 42, 44, 46 with the three photosensors then sensing a "light" condition. The signals provided by the three photosensors 42, 44, 46 to the CPU 36, together with the pulse signal count information provided to the CPU 36 by the encoder 38 results in the CPU determining that the bottle passing before the sensors is in its upright condition and is properly formed and it should not be ejected from the conveyor.

A bottle conveyed by the conveyor 14 with the bottle in an inverted orientation is sensed by the pair of optic fiber photosensor assemblies 32, 34 in combination with the fourth photosensor 48. While the fourth photosensor 48 senses a "dark" condition, the bottle spout 26 of the inverted bottle will be positioned directly between the two optic fiber photosensor assemblies 32, 34, resulting in these two assemblies sending a "light" signal to the CPU. The fourth photosensor 48 sending a "dark" signal to the CPU in combination with the two optic fiber photosensor assemblies 32, 34, sending a "light" signal to the CPU 36 at any time while the fourth photosensor 48 is sensing the "dark" signal results in the CPU determining that an inverted bottle is being conveyed past the photosensors. With this information the CPU 36 monitors the pulse signals produce by the encoder 38 that is representative of the period of conveyor operation when the bottle is moved to the jets and at a predetermined and specific count of the encoder pulse signals, the CPU 36 then controls the two solenoid valves, 58, 60 to open for a short, predetermined and precise encoder count just as the inverted bottle is passing before the two air jet nozzles 52, 54 resulting in a burst of air ejecting from the nozzles that removes the inverted bottle from the conveyor 14.

The situation where a sideways oriented bottle laying on its side on the conveyor support surface 20 is determined by only the first or bottom photosensor 42 in the vertical array sensing a "dark" condition while the other photosensors sense a "light" condition. The period of conveyor operation that the bottom photosensor 42 senses the "dark" condition, in addition to the count of pulsed signals produced by the encoder 38 and monitored by to the CPU 36 indicative of the conveyor operation period that the first photosensor 42 senses the "dark" condition, results in the CPU 36 determining that a sideways oriented bottle is being conveyed by the conveyor 14 past the photosensors. This results in the CPU 36 further monitoring the count of the pulsed signals produced by the encoder and at a predetermined count of signals, controlling the solenoid valve 58 associated with the first or bottom air jet 52 to open just as the middle of the sideways bottle passes before the bottom air jet 52. This results in a burst of air being ejected from the air jet 52 that removes the bottle from the conveyor 14. The duration of the burst of air is for a predetermined and preset count of encoder pulsed signals that is sufficient to produce the burst of energy required to eject a sideways oriented bottle from the conveyor.

The apparatus of the invention also detects when two bottles, each oriented sideways, are conveyed by the conveyor 14 with one bottle stacked on the other. For smaller bottles having smaller diameters, as the bottles are conveyed past the apparatus, the bottom two vertically arrayed photosensors 42, 44 will sense a "dark" condition in a similar manner to when they sense an upright oriented bottle. However, the two sensors 42, 44 will sense the "dark" condition for a longer period of conveyor operation, determined by the signals of the encoder 38, than that when an upright bottle passes before the sensors. The length of the two sideways bottles, being greater than their diameter, results in the encoder 38 providing a count of signals to the CPU 36 that indicates that the two photosensors 42, 44 are sensing the "dark" condition for a longer period of conveyor operation than that of an upright bottle. This results in the CPU 36 determining that a pair of sideways oriented bottles, one stacked on the other, is being conveyed by the conveyor 14 past the photosensors. This results in the CPU 36 further monitoring the count of signals produced by the encoder 38 and at a predetermined number of signals at which the conveyor has moved the bottles to positions adjacent the air jet nozzles 52, 54, controlling both of the first and second solenoids 58, 60 to open just as the two bottles are being conveyed past the first and second air jets 52, 54. This causes both air jets 52, 54 to eject a burst of air across the conveyor 14 for a predetermined duration of encoder signals that removes the two sideways oriented bottles from the conveyor.

The three photosensors 42, 44, 46 in the vertical line are provided instead of just two photosensors in a vertical line in order that the apparatus 10 can be used in detecting the orientation of larger bottles. The operation of the apparatus 10 in detecting the orientations of larger bottles is the same as that explained earlier for the smaller bottles except the operation of the apparatus differs when the larger bottle is oriented sideways or on its side on the conveyor surface 20. A single large bottle on its side will cause the bottom two photosensors 42, 44 of the vertical line of sensors to sense a "dark" condition for an extended period of conveyor operation represented by counts or pulses of the encoder 38. With this information, the CPU 36 determines that a large bottle is lying on its side on the conveyor, requiring that the two solenoid valves 58, 60 be opened for a slightly longer period of conveyor operation to provide a greater blast of air from the two air jets 52, 54 needed to eject the larger bottle from the conveyor 14. If all three photosensors 42, 44, 46 in the vertical line simultaneously sense a "dark" condition for an extended period of conveyor operation represented by pulses of the encoder 38, the CPU 36 determines that two larger bottles laying on their side, one on the other, are being conveyed by the conveyor. This results in the CPU 36 further monitoring the count of encoder signals and at a predetermined number of signals when the bottles have moved to positions adjacent the air jet nozzles 52, 54, the CPU controls the solenoid valves 58, 60 to open for a predetermined count of encoder signals, providing larger and extended blasts of air from the two air jets 52, 54 needed to eject both of the large bottles from the conveyor 14.

The apparatus of the invention also detects when a bottle deposited on the conveyor in an acceptable range of a slanted orientation is conveyed past the apparatus 10. Depending on the size of the bottle, a bottle that is slanted at an angle of approximately 10 degrees relative to the vertical will return to its upright orientation further downstream of the conveyor system and most likely will not fall over onto its side. With the spacing between bottles conveyed by the conveyor 14, it is possible for a bottle to be positioned on the conveyor support surface 20 with the bottle slanted either rearwardly or forwardly at the acceptable 10 degree angle and engaging against an adjacent bottle.

A smaller bottle conveyed by the conveyor 14 with an acceptable degree of slant, for example 10 degrees or less depending on the size and shape of the bottle, and with the bottle slanting so that its spout 26 is directed toward the upstream end 28 of the conveyor, is detected by the two bottom vertically in-line photosensors 42, 44. As the slanting bottle is conveyed toward these photosensors, the first or bottom photosensor 42 will first sense a "dark" condition. The second or middle photosensor 44 will next detect the "dark" condition. If the count of the encoder pulsed signals between the bottom photosensor 42 sensing a "dark" condition and the middle photosensor 44 sensing a "dark" condition is within an acceptable period of conveyor operation represented by a predetermined count of the pulses of the encoder 38, then the bottle is at an acceptable degree of slant. This information provided by the photosensor signals to the CPU 36 results in the CPU determining that a bottle being conveyed through the apparatus is slanted rearward at an acceptable degree of slant and the bottle is not ejected from the conveyor. If the bottle is slanted too far or greater than 10 degrees, the count of the signal pulses produced by the encoder 38 between the bottom photosensor 42 sensing a "dark" condition and the middle photosensor 44 sensing a "dark" condition will be greater than the preprogrammed acceptable count of encoder pulses. When this condition is determined by the CPU 36 from the signals provided by the bottom photosensor 42 and the middle photosensor 44, as well as the count pulses provided by the encoder 38 between the two photosensor signals, the CPU 36 further monitors the count of encoder pulse signals and at a predetermined number of signals when the bottle has moved to a position adjacent to air jet nozzles 52, 54, the CPU controls the solenoids 58, 60 to open in a sequence with the first solenoid 58 opening first and the second solenoid 60 opening second. The solenoids are only opened for a short interval of encoder signals and the opening of the solenoids controlled by the CPU 36 is staggered. The staggered blasts of air ejected by the two air jets strike the bottom of the bottle and then the intermediate portion of the bottle, causing it to be ejected from the conveyor 14.

When all three vertical sensors 42, 44, 46 sense a "light" condition after each bottle passes the sensors, the CPU is reset to receive the next set of signals from the sensors. Also, following the rejection and ejection of a bottle from the apparatus, when all three vertical sensors 42, 44, 46 sense a "light" condition, the CPU is reset to receive the next set of signals from the sensors.

The operation of the apparatus 10 in detecting a bottle conveyed at an acceptable degree of slant where the bottle spout 26 is directed toward the downstream end 30 of the conveyor is basically the reverse of that for when the bottle is slanted with its spout directed toward the downstream end 30 of the conveyor. The bottle will first cause the middle photosensor 44 of the vertically arranged photosensors to sense a "dark" condition. The bottom photosensor 42 will then sense a "dark" condition as the bottle passes before the sensors. If the count of the encoder signals between the middle photosensor 44 sensing a "dark" condition and the bottom photosensor 42 sensing a "dark condition is within an acceptable predetermined count of encoder signals, then the bottle is at an acceptable degree of slant. This information provided by the photosensor signals to the CPU 36 results in the CPU determining that a bottle being conveyed through the apparatus is slanted forward at an acceptable degree of slant and the bottle is not ejected from the conveyor. If the slanted bottle sensed is not at an acceptable degree of slant, i.e. greater than 10 degrees, the CPU 36 controls the two solenoid valves 58, 60 to open. However, with the bottle slanting in a downstream direction, the second solenoid 60 opens first, followed by opening of the first solenoid 58 a short period thereafter, resulting in a blast of air first being ejected from the top or second air jet 54, followed shortly thereafter by a blast of air ejected from the bottom air jet 52 ejecting the bottle from the conveyor.

The operation of the apparatus 10 in detecting a larger bottle with an acceptable degree of slant, for example 10 degrees, is slightly different. When a large bottle slanting toward the upstream end 28 of the conveyor is conveyed past the three vertically arranged photosensors 42, 44, 46, the larger diameter of the bottle elevates the leading edge of the bottom of the bottle to an extent that the lower or bottom photosensor 42 will actually continue to sense a "light" condition beneath the bottom of the bottle as the leading edge of the bottle is conveyed past the photosensor. Therefore, the top two photosensors 44, 46 are used when detecting a large bottle with an acceptable degree of slant. Apart from this difference, the operation of the apparatus is basically the same as that when detecting smaller bottles with acceptable degrees of slant. As the bottle slanting toward the conveyor upstream end 28 is conveyed toward the photosensors, the middle photosensor 44 will first sense a "dark" condition. The top photosensor 46 will next detect the "dark" condition. If the top photosensor senses the "dark" condition within an acceptable period of conveyor operation represented by a predetermined count of pulse signals produced by the encoder 38, this information provided by the photosensor signals to the CPU 36 results in the CPU determining that a large bottle being conveyed through the apparatus is slanted toward the conveyor upstream end 28 at an acceptable degree of slant and is not ejected from the conveyor. If the bottle is slanted too far or greater than 10 degrees, the count of the signal pulses produced by the encoder 38 between the middle photosensor 44 and the top photosensor 46 sensing a "dark" condition will be greater than the preprogrammed acceptable count of encoder signals. When this condition is determined by the CPU 36 from the signals provided by the top two photosensors 44, 46 and the count of encoder signals between the two photosensors sensing a "dark" condition, the CPU further monitors the count of encoder signals and at a predetermined number of signals when the bottle has moved to a position adjacent the air jet nozzles 52, 54, the CPU controls the solenoids 58, 60 to open in a sequence with the first solenoid 58 opening first and the second solenoid 60 opening second. The solenoids are opened for a period of encoder signals that is sufficient to produce a blast of air from the two nozzles 52, 54 that will remove the large bottle from the conveyor. The opening of the solenoids controlled by the CPU 36 is staggered so that the blasts of air ejected by the two air jet nozzles 52, 54 will also be staggered and will strike the bottom of the bottle first and then the intermediate portion of the bottle, causing it to be ejected from the conveyor 14.

The operation of the apparatus 10 in detecting a large bottle conveyed at an acceptable degree of slant where the bottle spout 26 is directed toward the conveyor downstream end 30 is basically the reverse of that for when the bottle is slanted with its spout directed toward the conveyor upstream end 28. The bottle will first cause the top photosensor 46 of the vertically arranged photosensors to sense a "dark" condition. The middle photosensor 44 will then sense a "dark" condition as the bottle passes before the sensor. If the middle photosensor 44 senses the "dark" condition within an acceptable period of conveyor operation represented by a predetermined count of the pulsed signals produced by the encoder 38, this information provided by the photosensor signals to the CPU 36 results in the CPU determining that a bottle being conveyed through the apparatus is slanted forward toward the conveyor downstream end 30 at an acceptable degree of slant and the bottle is not ejected from the conveyor. If the count of encoder signals is greater than the predetermined count, the slanted bottle sensed is not at an acceptable degree of slant, i.e. greater than 10 degrees, and the CPU controls the two solenoid valves 58, 60 to open. However, with the bottle slanting in a downstream direction, the second solenoid 60 opens first, followed by the opening of the first solenoid 58 a short period thereafter, resulting in a blast of air first being ejected from the top or second air jet 54, followed shortly thereafter by a blast of air ejected from the bottom air jet 52, ejecting the bottle from the conveyor.

In addition to improperly oriented bottles, the apparatus 10 also detects improperly formed and crushed or damaged bottles as well as other debris conveyed by the conveyor 14 and ejects these objects from the conveyor. An improperly formed bottle in an upright orientation with the bottle top, side or bottom being improperly formed, will not cause the three vertically arranged photosensors 42, 44, 46 to sense a "dark" signal at the approximate same time. In addition, the period of conveyor operation that these three photosensors sense the "dark" condition as represented by pulses from the encoder 38 will be different from the preprogrammed time periods of the encoder during which the sensors sense a slanted bottle. With this information, the CPU 36 determines that an improperly formed bottle is being conveyed by the conveyor 14 and, after a predetermined count of encoder signals, controls the solenoid valves 58, 60 to open for a short period causing blasts of air to be ejected from the air jets 52, 54, ejecting the improperly formed bottle from the conveyor. Any crushed or damaged bottles or other debris conveyed on the conveyor 14 will cause the first or bottom photosensor 42 of the vertical line of sensors to sense a "dark" condition. This information provided to the CPU 36 results in it determining that there is a crushed or damaged bottle or other object of debris on the conveyor which in turn causes it to control the first solenoid 58 to open for a short period to supply a blast of air from the first air jet 52 that removes the crushed, damaged bottle or other debris from the conveyor.

As explained earlier, the jam detecting photosensor 66 and jam ejecting air jet nozzles 68 are provided to remove any bottle or bottles that become jammed on the conveyor 14 as they enter between the opposed pair of guide rails 50, 72. Should one or more bottles become jammed on the conveyor as they enter between the guide rails, the jam detecting photosensor 66 will sense a "dark" condition for a period of conveyor operation represented by pulses of the encoder 38 that is greater than the period of conveyor operation for a single upright bottle to pass before the photosensor. With this information provided to the CPU 36, the CPU determines that a jam exists where the two guide rails 50, 72 come together and the CPU controls the two solenoid valves 58, 60 of the first and second air jets 52, 54 to open for an extended period of encoder signals, as well as controls the solenoid valve 74 of the jam ejecting air jet nozzles 68 to open for the extended period of encoder signals, resulting in blasts of air being ejected from these four nozzles in the ejection paths 62, 76 across the conveyor 14 shown in FIG. 2. These extended blasts of air remove all the bottles accumulated on the conveyor 14 between the nozzles, clearing the conveyor of any bottles jammed on the conveyor. When the jam photosensor 66 then senses a "light" condition for a short period of conveyor operation, the CPU controls the jam ejecting solenoid valve 74 to close and sequentially, with the three vertically arranged photosensors 42, 44, 46 sensing a "light" condition, the CPU controls the closing of the two ejection solenoid valves 58, 60.

The apparatus and its method of operation described above provides an automated system that detects improperly oriented bottles and defective bottles, as well as other debris conveyed on the conveyor and ejects these bottles and/or debris from the conveyor in a cost-efficient manner.

While the present invention has been described by reference to a specific embodiment, it should be understood that modifications and variations of the invention may be constructed without departing form the scope of the invention defined in the following claims.

What is claimed:

1. A reject object detection and ejection apparatus comprising:

a conveyor having a length with opposite upstream and downstream ends, the conveyor being operable to convey a sequence of objects on the conveyor from the conveyor upstream end to the conveyor downstream end;

means positioned along the length of the conveyor for sensing an orientation of an object of the sequence of objects conveyed on the conveyor and producing a signal representative of the sensed orientation of the object;

means positioned along the length of the conveyor for removing the object from the conveyor in response to the signal representative of the sensed orientation of the object;

the means for sensing an orientation of an object also distinguishing between an upright and an inverted orientation of the object;

the means for sensing an orientation of an object comprising a plurality of vertically arranged sensors, the sensors sensing a presence or an absence of an object on the conveyor adjacent the sensors and producing the signal representative of the sensed orientation of the object; and, an encoder in communication with the plurality of sensors that produces signals representative of a period of conveyor operation during which each sensor senses the presence or absence of an object on the conveyor adjacent the sensor.

2. A reject object detection and ejection apparatus comprising:

a conveyor having a length with opposite upstream and downstream ends, the conveyor being operable to convey a sequence of objects on the conveyor from the conveyor upstream end to the conveyor downstream end;

means positioned along the length of the conveyor for sensing an orientation of an object of the sequence of objects conveyed on the conveyor and producing a signal representative of the sensed orientation of the object;

means positioned along the length of the conveyor for removing the object from the conveyor in response to the signal representative of the sensed orientation of the object;

the means for sensing an orientation of an object also distinguishing between an upright and a slanted orientation of the object;

the means for sensing an orientation of an object comprising a plurality of vertically arranged sensors, the sensors sensing a presence or an absence of an object on the conveyor adjacent the sensors and producing the signal representative of the sensed orientation of the object; and, an encoder in communication with the plurality of sensors that produces signals representative of a period of conveyor operation during which each sensor senses the presence or absence of an object on the conveyor adjacent the sensor.

3. A reject object detection and ejection apparatus comprising:

a conveyor having a length with opposite upstream and downstream ends, the conveyor being operable to convey a sequence of objects on the conveyor from the conveyor upstream end to the conveyor downstream end;

means positioned along the length of the conveyor for sensing an orientation of an object of the sequence of objects conveyed on the conveyor and producing a signal representative of the sensed orientation of the object;

means positioned along the length of the conveyor for removing the object from the conveyor in response to the signal representative of the sensed orientation of the object;

the means for sensing an orientation of an object also distinguishing between an upright orientation of the object and a pair of sideways oriented objects stacked one on the other;

the means for sensing an orientation of an object comprising a plurality of vertically arranged sensors, the sensors sensing a presence or an absence of an object on the conveyor adjacent the sensors and producing the signal representative of the sensed orientation of the object; and, an encoder in communication with the plurality of sensors that produces signals representative of a period of conveyor operation during which each sensor senses the presence or absence of an object on the conveyor adjacent the sensor.

4. A reject object detection and ejection apparatus comprising:

a conveyor having a length with opposite upstream and downstream ends, the conveyor being operable to convey a sequence of objects on the conveyor from the conveyor upstream end to the conveyor downstream end;

means positioned along the length of the conveyor for sensing an orientation of an object of the sequence of objects conveyed on the conveyor and producing a signal representative of the sensed orientation of the object;

means positioned along the length of the conveyor for removing the object from the conveyor in response to the signal representative of the sensed orientation of the object;

the means for sensing an orientation of an object also sensing a condition of the object and producing a signal representative of the condition of the object;

the means for removing the object from the conveyor in response to the signal representative of the sensed orientation of the object also removing the object from the conveyor in response to the signal representative of the sensed condition of the object;

the means for sensing an orientation of an object comprising a plurality of vertically arranged sensors, the sensors sensing a presence or an absence of an object on the conveyor adjacent the sensors and producing the signal representative of the sensed orientation of the object; and, an encoder in communication with the plurality of sensors that produces signals representative of a period of conveyor operation during which each sensor senses the presence or absence of an object on the conveyor adjacent the sensor.

5. The apparatus of claim 1, further comprising:

the means for sensing an orientation of an object also distinguishing between an upright and a sideways orientation of the object.

6. The apparatus of claim/further comprising:

the means for sensing an orientation of an object also distinguishing between an upright and a slanted orientation of the object.

7. The apparatus of claim 1, further comprising:

the means for sensing an orientation of an object also distinguishing between an upright orientation of the object and a pair of sideways oriented objects stacked one on the other.

8. The apparatus of claim 4, further comprising:

the means for sensing an orientation of an object also distinguishing between an upright and an inverted orientation of the object.

9. The apparatus of claim 4, further comprising:

the means for sensing an orientation of an object also distinguishing between an upright and a sideways orientation of the object.

10. The apparatus of claim 4, further comprising:

the means for sensing an orientation of an object also distinguishing between an upright and a slanted orientation of the object.

11. The apparatus of claim 4, further comprising:

the means for sensing an orientation of an object also distinguishing between an upright orientation of the object and a pair of sideways oriented objects stacked one on the other.

12. A reject object detection and ejection apparatus comprising:

a conveyor having a length with opposite upstream and downstream ends, the conveyor being operable to convey a sequence of objects on the conveyor from the conveyor upstream end to the conveyor downstream end;

means positioned along the length of the conveyor for sensing an orientation of an object of the sequence of objects conveyed on the conveyor and producing a signal representative of the sensed orientation of the object;

means positioned along the length of the conveyor for removing the object from the conveyor in response to the signal representative of the sensed orientation of the object;

the means for sensing an orientation of an object comprising a plurality of sensors arranged in a vertical line, the sensors sensing a presence or an absence of an object on the conveyor adjacent the sensors and producing the signal representative of the sensed orientation of the object; and, an encoder in communication with the plurality of sensors that produces signals representative of a period of conveyor operation during which each sensor senses the presence or absence of an object on the conveyor adjacent the sensor.

13. A reject object detection and ejection apparatus comprising:

a conveyor having a length with opposite upstream and downstream ends, the conveyor being operable to convey a sequence of objects on the conveyor from the conveyor upstream end to the conveyor downstream end;

means positioned along the length of the conveyor for sensing an orientation of an object of the sequence of objects conveyed on the conveyor and producing a signal representative of the sensed orientation of the object;

means positioned along the length of the conveyor for removing the object from the conveyor in response to the signal representative of the sensed orientation of the object;

the means for sensing an orientation of an object comprising a plurality of sensors arranged in a vertical line, the sensors sensing a presence or an absence of an object on the conveyor adjacent the sensors and producing the signal representative of the sensed orientation of the object; and, the means for sensing an orientation of an object further comprising an encoder in communication with the plurality of sensors that produces signals representative of a period of conveyor operation each sensor senses the presence or absence of an object on the conveyor adjacent the sensor.

14. The apparatus of claim 12, further comprising:

the means for sensing an orientation of an object further comprising an additional sensor that is not in the vertical line of the plurality of sensors.

15. The apparatus of claim further comprising:

the means for sensing an orientation of an object further comprising a plurality of optic fiber photosensors arranged in at least two vertical lines that are spaced from each other along the length of the conveyor.

16. The apparatus of claim 13, further comprising:

the means for removing the object from the conveyor comprises an air jet nozzle.

17. A reject object detection and ejection apparatus comprising:

a conveyor having a length with opposite upstream and downstream ends, the conveyor being operable to convey a sequence of objects on the conveyor from the conveyor upstream end to the conveyor downstream end;

means positioned along the length of the conveyor for sensing an orientation of an object of the sequence of objects conveyed on the conveyor and producing a signal representative of the sensed orientation of the object;

a reject air jet positioned along the length of the conveyor for removing the object from the conveyor in response to the signal representative of the sensed orientation of the object;

means positioned along the length of the conveyor for sensing an object of the sequence of objects conveyed on the conveyor becoming jammed on the conveyor and producing a signal representative of the sensed jammed object; and a jam eject air jet positioned along the length of the conveyor for removing the jammed object from the conveyor in response to the signal representative of the sensed jammed object.

18. The apparatus of claim 17, further comprising:

the means for sensing an orientation of an object on the conveyor and the means for sensing an object becoming jammed on the conveyor are spaced from each other along the length of the conveyor.

* * * * *